United States Patent
Mori et al.

[11] Patent Number: 6,160,726
[45] Date of Patent: Dec. 12, 2000

[54] POWER CONVERTER INCLUDING POSITIVE BUS GROUND

[75] Inventors: Norihito Mori; Masakatu Daijou; Akinori Nishihiro; Takashi Yamada; Shigemi Kuriyama, all of Tokyo, Japan

[73] Assignee: Mitsubishi Denki Kabushiki Kaisha, Tokyo, Japan

[21] Appl. No.: 09/419,786

[22] Filed: Oct. 18, 1999

Related U.S. Application Data

[63] Continuation of application No. 09/355,122, Oct. 18, 1999, abandoned, and a continuation of application No. PCT/JP97/04293, Nov. 25, 1997.

[51] Int. Cl.$^7$ .......................... H02H 7/122; H02M 7/68; H02M 7/44
[52] U.S. Cl. ............................... 363/98; 363/58; 363/132
[58] Field of Search ................................. 363/16, 17, 95, 363/98, 123, 131, 132, 40, 58; 323/908

[56] References Cited

U.S. PATENT DOCUMENTS 5,552,976  9/1996  Munro et al. .............................. 363/39
5,638,266  6/1997  Horie et al. .............................. 363/132

FOREIGN PATENT DOCUMENTS

| | | | |
|---|---|---|---|
| 64-16271 | 1/1989 | Japan | H02M 7/537 |
| 4-140072 | 5/1992 | Japan | H02M 7/5387 |
| 8-103071 | 4/1996 | Japan | H02M 3/155 |

*Primary Examiner*—Shawn Riley
*Assistant Examiner*—Bao Q. Vu
*Attorney, Agent, or Firm*—Sughrue, Mion, Zinn, Macpeak & Seas, PLLC

[57] ABSTRACT

A power converter which can provide a power supply grounded on a positive electrode bus of a DC power supply without adding an additional power supply such as a switching regulator and reduce a circuit size and cost is described. When a switching device T1 of an upper arm is ON, the potential at point U is nearly equal to the potential at point P, and the current ic1 flows from the positive electrode of a first drive power supply 21 into a capacitor C1 via a diode D7 to charge the capacitor C1. A power supply Vc formed by the capacitor C1 can be used as a power supply grounded on a positive electrode bus P of the DC power supply.

17 Claims, 9 Drawing Sheets

POWER CONVERTER INCLUDING POSITIVE BUS GROUND

REFERENCE TO RELATED APPLICATIONS

The present Application is a continuation under 35 U.S.C. §111(a) of U.S. application Ser. No. 09/355,122, whose filing date is Oct. 18, 1999 now abandoned and a continuation of National Stage Application under 35 U.S.C. § 371 of International Application No. PCT/JP97/04293, whose international filing date is Nov. 25, 1997. The disclosures of both application Ser. No. 09/355,122 and Application No. PCT/JP97/04293 are incorporated by reference into the present Application. The benefit of the filing date of the International Application is respectfully requested.

FIELD OF THE INVENTION

The present invention relates to a power converter such as an inverter or a high power factor converter and, more particularly, to a power converter that has a power supply grounded on a positive electrode bus of a DC power supply.

BACKGROUND OF THE INVENTION

FIG. 7 shows a circuit configuration of a conventional three-phase voltage type PWM inverter system composed of a three-phase bridge circuit.

In the figure, reference numeral 11 denotes a DC power supply. Reference character P denotes a positive electrode bus of the DC power supply 11. Reference character N denotes a negative electrode bus of the DC power supply 11. Reference numeral 12 denotes an inverter for converting the DC power of the DC power supply 11 into AC power of a desired frequency and voltage. Reference characters T1–T6 denote switching devices. Reference characters D1–D6 denote diodes in antiparallel connection with the switching devices T1–T6, respectively. Reference numerals 21–23 and 24–26 respectively denote first and second drive power supplies, which are insulated each other so as to drive the switching devices T1–T6 independently. Reference numerals 31–36 denote drive circuits for driving the respective switching devices T1–T6. Reference character Vp denotes a power supply grounded on the positive electrode bus P of the DC power supply 11. Reference characters U, V, and W denote output terminals. Reference numeral 50 denotes a motor driven by the inverter system.

The inverter 12 is constituted by a three-phase bridge circuit which is provided between the positive and negative electrodes of the DC power supply 11 and which is composed of three sets of upper arm circuits (an upper arm circuit formed by the switching device T1 and the diode D1 in antiparallel connection, an upper arm circuit formed by the switching device T2 and the diode D2 in antiparallel connection, and an upper arm circuit formed by the switching device T3 and the diode D3 in antiparallel connection) and lower arm circuits (a lower arm circuit formed by the switching device T4 and the diode D4 in antiparallel connection, a lower arm circuit formed by the switching device T5 and the diode D5 in antiparallel connection, and a lower arm circuit formed by the switching device T6 and the diode D6 in antiparallel connection), drive power supplies 21 through 26, and drive circuits 31 through 36.

FIG. 8 shows a circuit configuration of a conventional three-phase voltage type PWM inverter system which has an inrush current limiting circuit using a thyristor. In the figure, reference numerals and reference characters 12, 21 through 26, 31 through 36, 50, T1 through T6, D1 through D6, P, N, U, V, and W denote the same components as those shown in FIG. 7; hence, the description thereof will be omitted.

Reference characters R, S, and T denote AC power supplies. Reference numeral 13 denotes a power rectifier composed of a diode bridge that rectifies the AC power supplies R, S, and T so as to convert them into DC power. Reference numeral 14 denotes a smoothing capacitor which is connected between buses P and N of the DC power supply and holds a DC voltage, which is an output of the power rectifier 13, at a constant level to ensure smooth control of the inverter 12. Reference character R5 denotes an inrush current limiting resistor for restricting the inrush current into the smoothing capacitor 14. Reference numeral 15 denotes a thyristor for short-circuiting the resistor R5. Reference character R6 denotes a resistor for limiting the gate current of the thyristor 15. Reference numeral 16 denotes a photocoupler for firing the thyristor 15. Reference numeral 17 denotes a control circuit for controlling a firing signal of the photocoupler 16. Reference character Vp denotes a power supply for controlling the gate of the thyristor 15 and or firing the photocoupler 16.

The power supply Vp, the resistor R5, the thyristor 15, he resistor R6, the photocoupler 16, and the control circuit 17 collectively make up the inrush current limiting circuit.

The operation of the inrush current limiting circuit will now be described.

When the AC power supplies R, S, and T are turned ON, charging current toward the smoothing capacitor 14 flows into the power rectifier 13. The smoothing capacitor 14 generally has a large capacitance, so that the charging current reaches to an undue inrush current level.

For this reason, the resistor R5 is usually inserted in a circuit of the smoothing capacitor 14 so as to restrict the inrush current which flows into the smoothing capacitor 14 when the AC power supplies R, S, and T are turned ON, thereby protecting the power rectifier 13.

The smoothing capacitor 14 is charged after a lapse of certain time, then the thyristor 15 is fired to short-circuit the both ends of the resistor R5 so as to start the operation. The thyristor 15 is fired (turned ON/OFF) by the resistor R6, the photocoupler 16, and the control circuit 17. Current is supplied to the gates of the photocoupler 16 and the thyristor 15 from the power supply Vp such as a switching regulator grounded on the positive electrode bus P of the DC power supply.

FIG. 9 shows the configuration of a current detection circuit for detecting the current of the positive electrode bus of the conventional three-phase voltage type PWM inverter.

In the figure, reference numerals and reference characters 11, 12, 21 through 26, 31 through 36, 50, P, N, U, V, and W denote the same components as those shown in FIG. 7, and therefore, the description thereof will be omitted.

Reference character Po denotes a positive electrode bus of the DC power supply 11. Reference character R7 denotes a resistor for detecting current that is connected in series between the positive electrode buses P and Po of the DC power supply 11. Reference numeral 18 denotes an insulating amplifier for insulating the voltage of the resistor R7 from the positive electrode bus of the DC power supply 11. Reference numeral 19 denotes a detection circuit for detecting current. Reference character Vp denotes a power supply for driving the insulating amplifier 18 and it is grounded on the positive electrode bus Po.

The input section of the insulating amplifier 18 is connected to both ends of the resistor R7, while the output section thereof is connected to the detection circuit 19. The positive electrode of the power supply Vp is connected to a power input section A of the insulating amplifier 18.

The operation of the current detection circuit will now be described.

When current flows into the positive electrode of the DC power supply 11, a voltage is generated at both ends of the resistor R7 connected in series between the positive electrode buses P and Po of the DC power supply 11. The voltage generated at both ends of the resistor R7 is supplied to the detection circuit 19 via the insulating amplifier 18 so as to detect the current flowing into the positive electrode bus of the DC power supply 11.

The conventional power converter such as an inverter system or high power factor converter has been configured as discussed above. Hence, if a protecting circuit or the like adopts a power supply grounded on the positive electrode of a DC power supply, then another power supply Vp such as a switching regulator grounded on a positive electrode bus of a DC power supply 11 is required, thereby posing a problem in that the circuit size inevitably becomes larger with resultant higher cost.

SUMMARY OF THE INVENTION

The present invention has been made to solve the aforesaid problems, and it is an object thereof to provide a power converter that can provide a power supply grounded on the positive electrode bus of a DC power supply without adding an additional power supply such as a switching regulator and can reduce a circuit size and cost.

In order to accomplish the objects, a power converter according to present invention comprises a bridge circuit which has at least two sets of an upper arm circuit and a lower arm circuit composed of a switching device and a diode connected antiparallely and is provided between positive and negative electrodes of a DC power supply, a first drive power supply to drive the switching device of the upper arm circuit, a second drive power supply to drive the switching device of the lower arm circuit, a diode having an anode thereof connected to a positive electrode of the first drive power supply and a capacitor having one terminal thereof connected to a cathode of the diode and the other terminal thereof connected to the positive electrode of the DC power supply.

The power converter may further include resistors provided in series to the diode having an anode thereof connected to the positive electrode of the first drive power supply.

AS well, one resistor may be provided in series between the capacitor and the cathodes of the diodes having the anode thereof connected to the positive electrode of the first drive power supply.

The power converter is further controlled such that at least one switching device of the upper arm turns ON at the beginning of operation of the power converter.

The power converter may further comprise an inrush current limiting circuit composed of a resistor provided in series in the positive electrode bus of the DC power supply and a thyristor connected in parallel to the resistor, and a voltage generated in the capacitor is used as the power supply for firing the thyristor.

The power converter may also include a current detection circuit which has a resistor provided in series in the positive electrode bus of the DC power supply, an insulating amplifier for insulating the voltage of the resistor from the positive electrode bus, and a detection circuit for detecting a current based on an output of the insulating amplifier, and a voltage generated in the capacitor is used as the power supply for operating the insulating amplifier.

DETAILED DESCRIPTION OF THE PREFERRED EMBOIDMENTS

Figure 1:
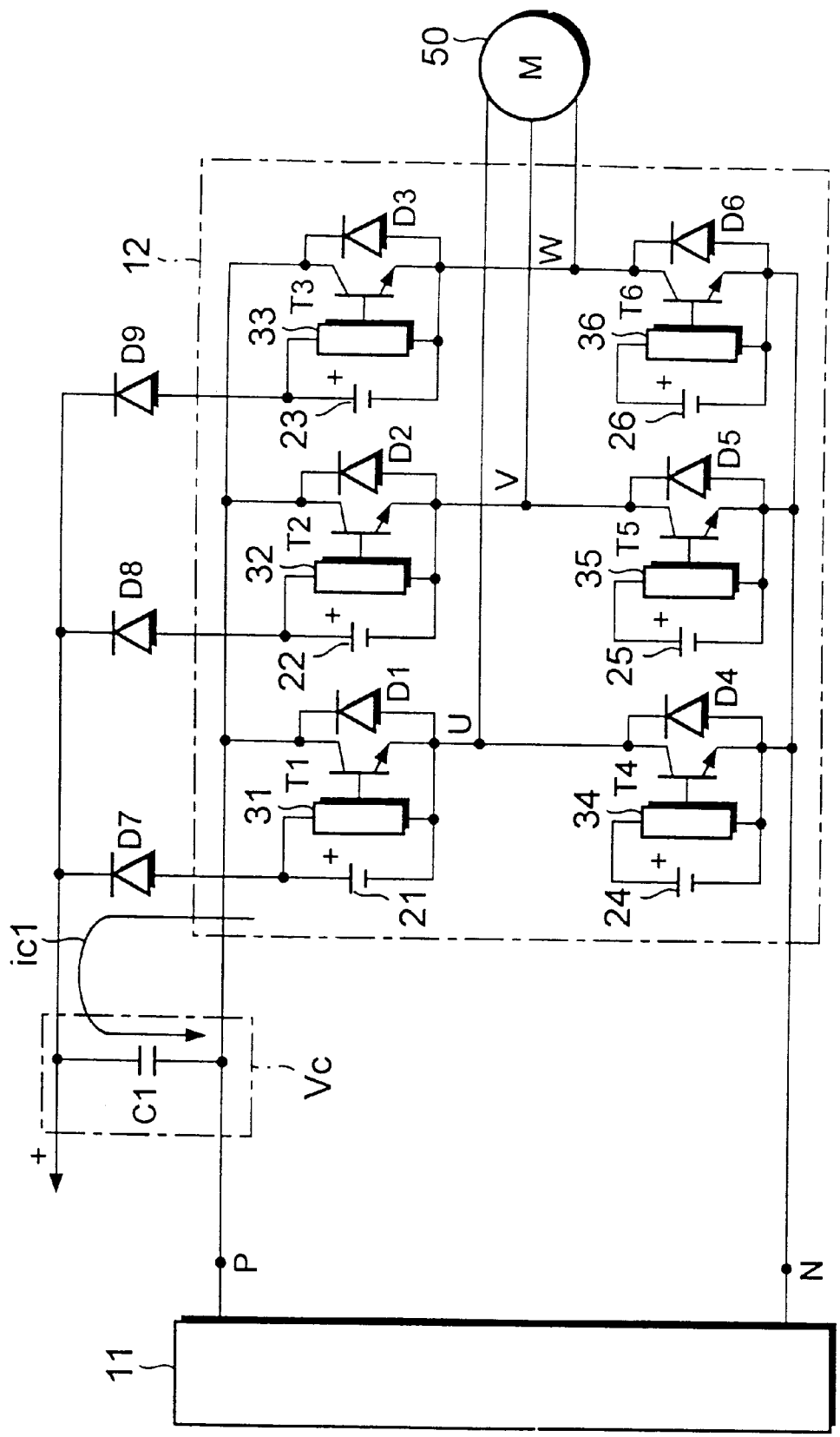
FIG. 1 is a circuit diagram showing an embodiment of a voltage type PWM inverter system in accordance with the present invention.

First Embodiment:

FIG. 1 is a diagram showing an embodiment of a circuit of a voltage type PWM inverter system according to the present invention. In the figure, reference numeral 11 denotes a DC power supply. Reference character P denotes a positive electrode bus of the DC power supply 11. Reference character N denotes a negative electrode bus of the DC power supply 11. Reference numeral 12 denotes an inverter for converting the DC power from the DC power supply 11 into AC power of a desired frequency and voltage. Reference characters U, V, and W denote output terminals. Reference numeral 50 denotes a motor driven by the inverter system.

The inverter 12 is formed by a three-phase bridge circuit which is provided between the positive and negative electrodes of the DC power supply 11 and which is composed of three sets of upper arm circuits (an upper arm circuit formed by a switching device T1 and a diode D1 in antiparallel connection, an upper arm circuit formed by a switching device T2 and a diode D2 in antiparallel connection, and an upper arm circuit formed by a switching device T3 and a diode D3 in antiparallel connection) and lower arm circuits (a lower arm circuit formed by a switching device T4 and a diode D4 in antiparallel connection, a lower arm circuit formed by a switching device T5 and a diode D5 in antiparallel connection, and a lower arm circuit formed by the switching device T6 and the diode D6 in antiparallel connection), drive power supplies 21 through 26, and drive circuits 31 through 36.

Reference characters D7 through D9 denote diodes for blocking backward voltage. Reference character C1 denotes a capacitor that stores energy to keep voltage and eliminates its ripple. Reference character Vc denotes a power supply provided by the capacitor C1. Reference character ic1 denotes current supplied to the capacitor C1.

The anodes of diodes D7–D9 are respectively connected to the positive electrodes of first drive power supplies 21 through 23; the cathodes of the diodes D7–D9 are connected to the capacitor C1; and the other terminal of the capacitor C1 is connected to the positive electrode bus P of the DC power supply 11.

The operation will now be described.

When the switching device T1 of the upper arm is ON, the potential at point U is nearly equal to the potential at point P, and a current ic1 flows from the positive electrode of the first drive power supply 21, which is insulated to drive the switching device T1, into the capacitor C1 via the diode D7 so as to charge the capacitor C1.

Similarly, when the switching devices T2 and T3 of the upper arms are ON, the current flows from the positive electrodes of the first power supplies 22 and 23, which are insulated each other so as to drive the switching devices T2 and T3 independently, into the capacitor C1 via the diodes D8 and D9.

Figure 2:
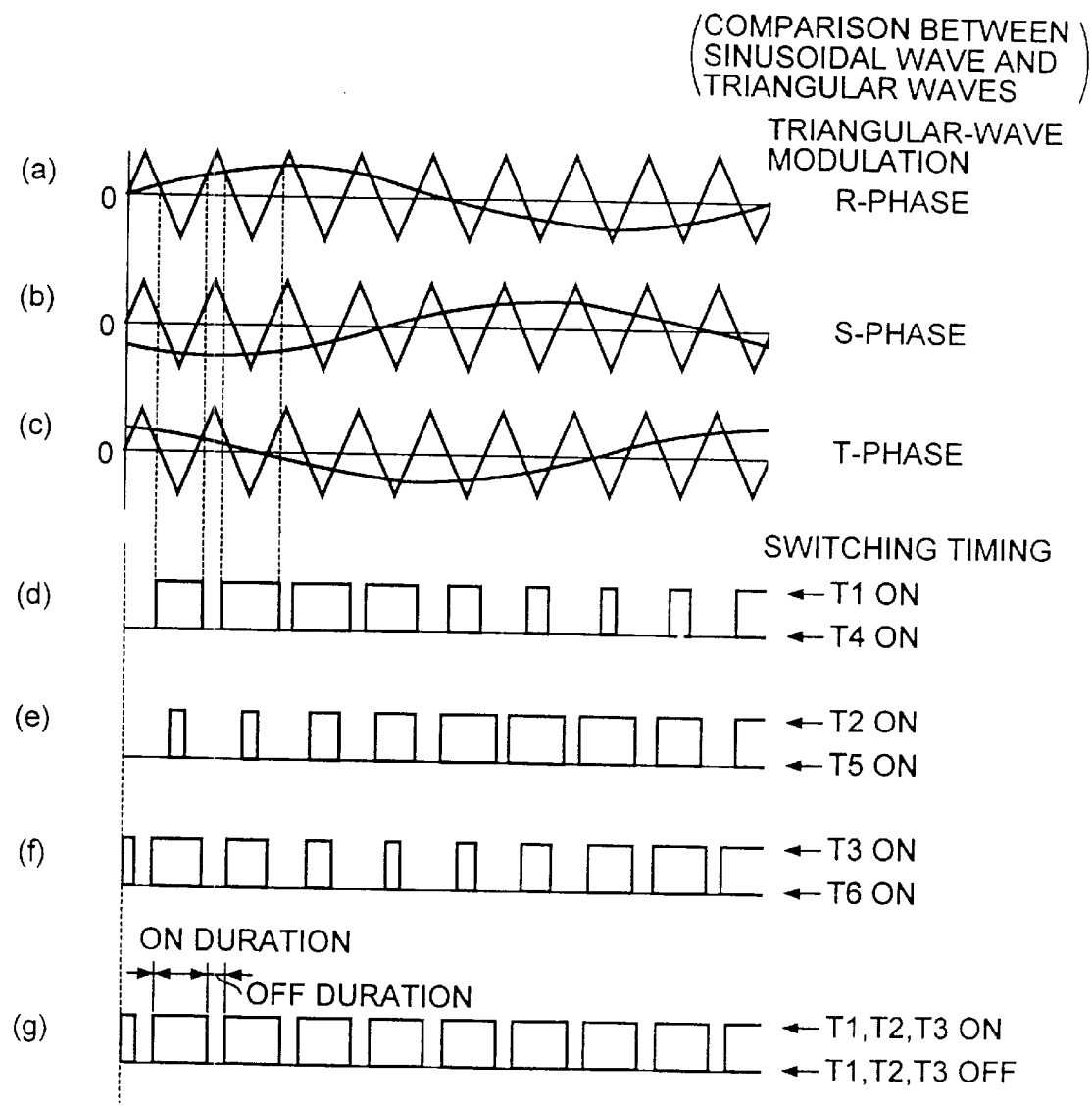
FIG. 2 is a diagram illustrating the principle of operation for obtaining a PWM pulse in a voltage type PWM inverter system in general use.

FIG. 2 is a diagram illustrating the principle of operation for obtaining a PWM pulse of a voltage type PWM inverter system in general use; (a), (b), and (c) show reference signals of sinusoidal waves (R-phase, S-phase, and T-phase) in comparison with the carrier waves of triangular waves (hereinafter referred to as "triangular waves"); and (d), (e), (f), and (g) illustrate the switching timings of the switching devices.

Referring to FIG. 1 and FIG. 2, the operation for charging the capacitor C1 will be described.

In the voltage-type PWM inverter system, PWM pulses are obtained by comparing the reference signals of sinusoidal waves with triangular waves, and the switching devices T1 through T3 of the upper arms turn ON when a reference signal of a sinusoidal wave is higher than a triangular wave, while they turn OFF when a reference signal of a sinusoidal wave is lower than a triangular wave. Since the triangular waves have equal intervals, thus, if the height of a reference signal of a sinusoidal wave is zero or more, the duration in which any of the switching devices T1 through T3 of the upper arm stays ON is longer than the duration in which it stays OFF.

The reference signal of a sinusoidal wave is larger than zero during the operation of the inverter system and the duration in which any of the switching devices T1, T2, and T3 of the upper arms stays ON is longer than the duration in which it stays OFF; hence, the charging period of the capacitor C1 is always longer than the discharging period thereof, so that the capacitor C1 is always in a charged state. This makes it possible to form a power supply Vc that has a nearly constant DC voltage grounded on the positive electrode of the DC power supply 11.

The configuration discussed above presents an advantage in that the power supply Vc formed by the capacitor C1 can be used as the power supply grounded on the positive electrode bus P of the DC power supply 11.

Figure 3:
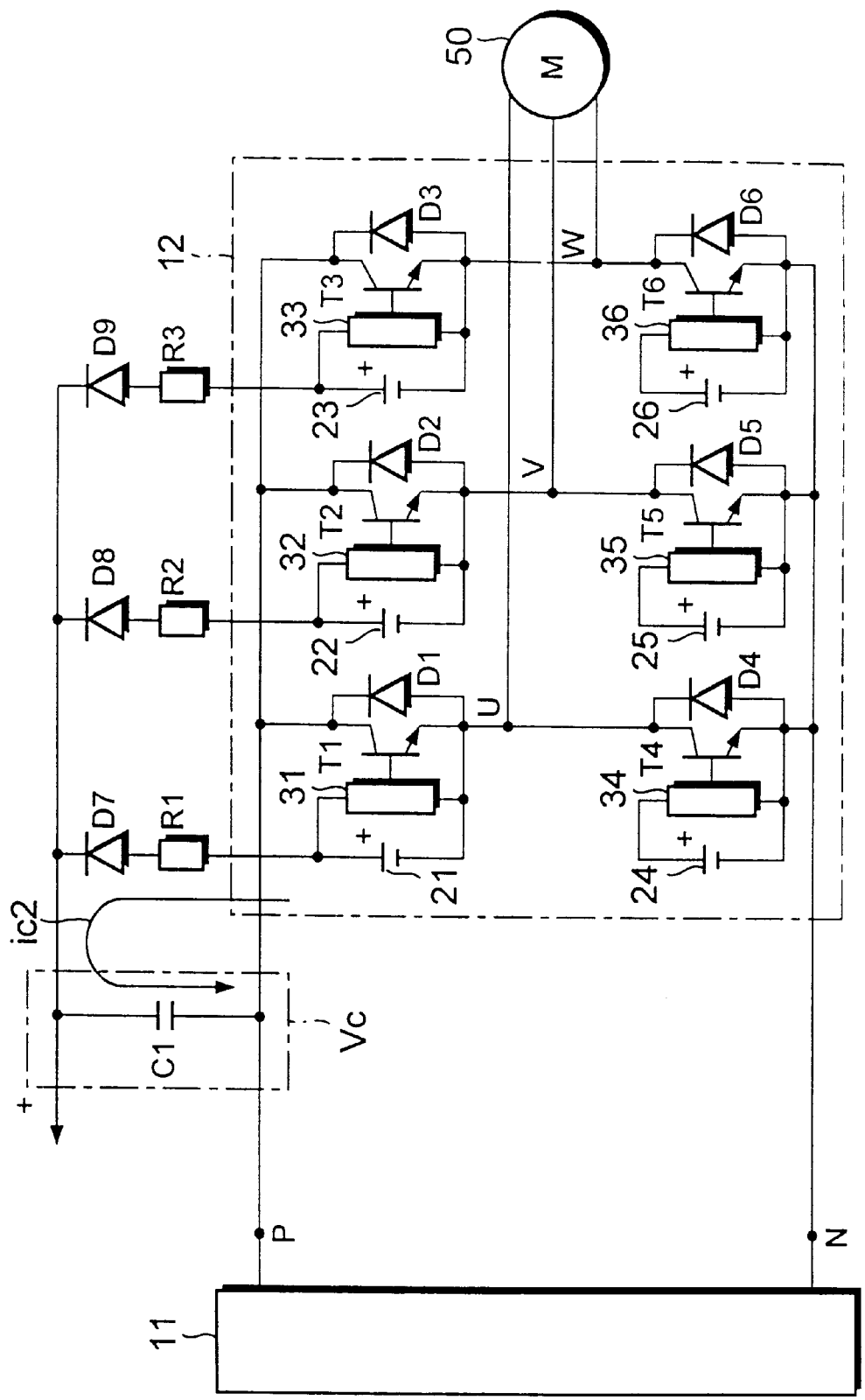
FIG. 3 is a diagram showing the circuit configuration of a voltage type PWM inverter system of a second embodiment in accordance with the present invention.

Second Embodiment:

FIG. 3 is a diagram showing the circuit configuration of a voltage type PWM inverter system of a second embodiment in accordance with the present invention. In the figure, the reference numerals and reference characters 11, 12, 21 through 26, 31 through 36, P, N, T1 through T6, D1 through D6, D7 through D9, U, V, W, C1, Vc, and 50 are identical to those shown in FIG. 1 of the foregoing first embodiment, and the description thereof will be omitted.

Reference characters R1 through R3 denote resistors for suppressing and limiting current, and ic2 denotes the current flowing into a capacitor C1.

The anodes of diodes D7–D9 are respectively connected to the positive electrodes of first drive power supplies 21 through 23 via the resistors R1–R3; the cathodes of the diodes D7–D9 are connected to the capacitor C1; and the other terminal of the capacitor C1 is connected to a positive electrode bus P of a DC power supply 11.

The operation of the second embodiment will now be described.

When a switching device T1 of an upper arm is ON, the potential at point U is nearly equal to the potential at point P, and current ic2 flows from the positive electrode of a first power supply 21, which is insulated to drive the switching device T1, into the capacitor C1 via the resistor R1 and the diode D7 to charge the capacitor C1.

Similarly, when switching devices T2 and T3 of the upper arms are ON, the current flows from the positive electrodes of first drive power supplies 22 and 23 to charge the capacitor C1 via the resistors R2, R3, and diodes D8, D9.

According to the second embodiment, the power supply Vc formed by the capacitor C1 can be used as a power supply based on the positive electrode bus P of the DC power supply 11. Moreover, the anodes of the diodes D7 through D9 are connected to the positive electrodes of the first drive power supplies 21 through 23 via the resistors R1 through R3; hence, even when the capacitance of the capacitor C1 is increased, inrush current into the capacitor C1 at the beginning of charging can be suppressed by the resistors R1 through R3, thus protecting the diodes D7 through D9 from damage.

Figure 4:
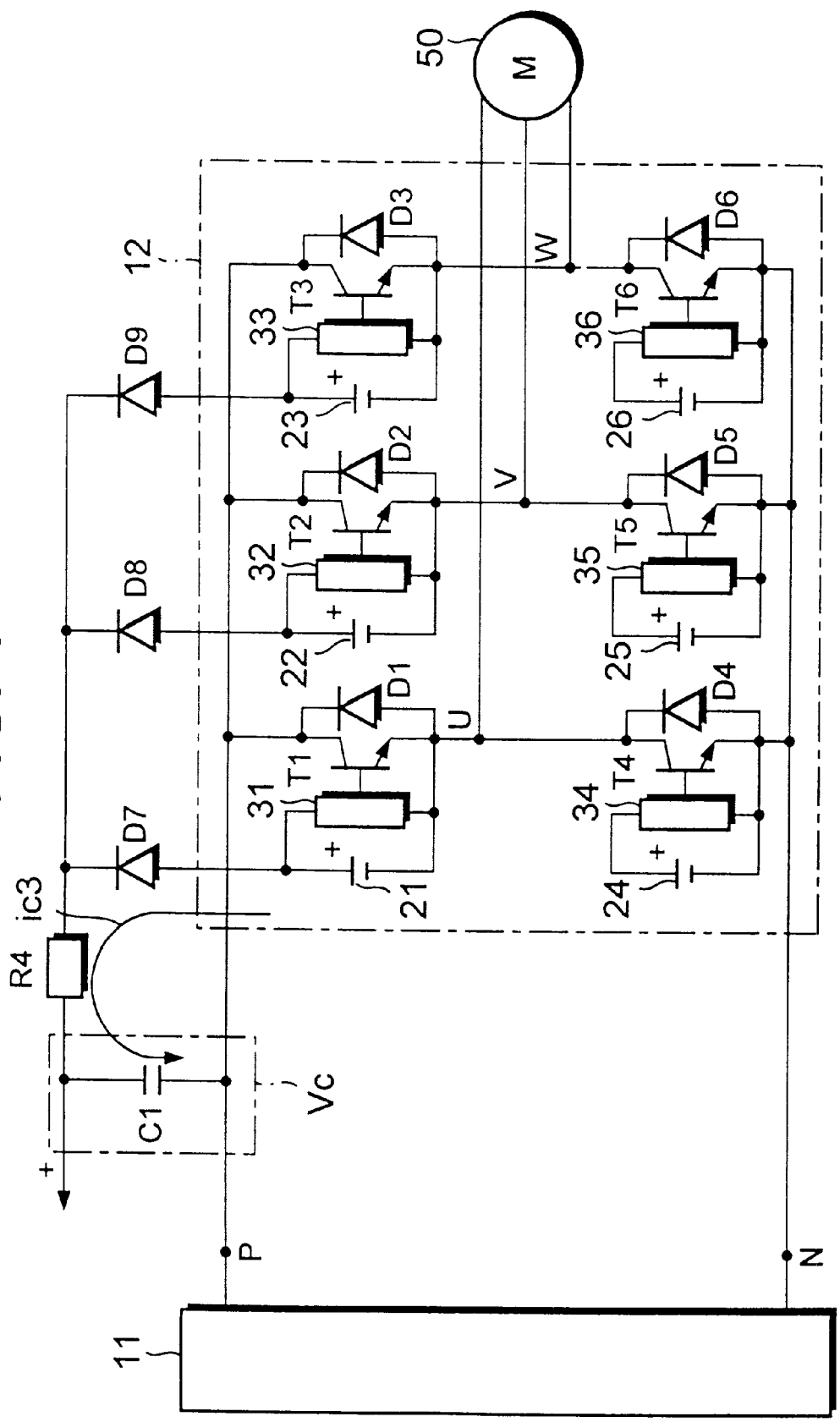
FIG. 4 is a diagram showing the circuit configuration of a voltage type PWM inverter system of a third embodiment in accordance with the present invention.

Third Embodiment:

FIG. 4 is a diagram showing the circuit configuration of a voltage type PWM inverter system of a third embodiment in accordance with the present invention. In the figure, the reference numerals and reference characters 11, 12, 21 through 26, 31 through 36, P, N, T1 through T6, D1 through D6, D7 through D9, U, V, W, C1, Vc, and 50 are identical to those shown in FIG. 1 of the foregoing first embodiment, and the description thereof will be omitted. Reference character R4 denotes a resistor for suppressing and limiting current, and ic3 denotes the current flowing into a capacitor C1.

The anodes of diodes D7–D9 are respectively connected to the positive electrodes of first drive power supplies 21 through 23; the cathodes of the diodes D7–D9 are connected to the capacitor C1 via the resistor R4; and the other terminal of the capacitor C1 is connected to a positive electrode bus P of a DC power supply 11.

The operation of the third embodiment will now be described.

When a switching device T1 of an upper arm is ON, the potential at point U is nearly equal to the potential at point P, and current ic3 flows from the positive electrode of a first drive power supply 21 into the capacitor C1 via the resistor R4 to charge the capacitor C1.

Similarly, when switching devices T2 and T3 of the upper arms are ON, the current flows from the positive electrodes of first power supplies 22 and 23, which are insulated to drive the switching devices T2 and T3, to charge the capacitor C1 via diodes D8, D9 and the resistor R4.

According to the principle of operation of the voltage type PWM inverter system described in FIG. 2 of the first embodiment, the charging period of the capacitor C1 is longer than the discharging period, so that the capacitor C1 stays charged at all times. This makes it possible to provide a power supply Vc that has a nearly constant DC voltage grounded on the positive electrode P of the DC power supply 11.

In the second embodiment, an example has been shown in which the resistors R1 through R3 are connected, as the resistors for suppressing and limiting current, to the diodes D7 through D9, respectively; in the third embodiment, only one resistor, the resistor R4, is connected between the cathodes of the diodes D7 through D9 and the capacitor C1, contributing a reduced number of components.

Fourth Embodiment:

In the foregoing first through third embodiments, the examples have been shown in which the power supply Vc grounded on the positive electrode of the DC power supply 11 is obtained by charging the capacitor C1 during the operation of the voltage type PWM inverter system composed of the three-phase bridge circuit. However, even in a transitional state such as the start of operation, the capacitor C1 can be also charged and the power supply Vc grounded on the positive electrode of the DC power supply 11 can be obtained by controlling such that at least one of the switching devices T1 through T3 of the upper arms turns ON.

Figure 5:
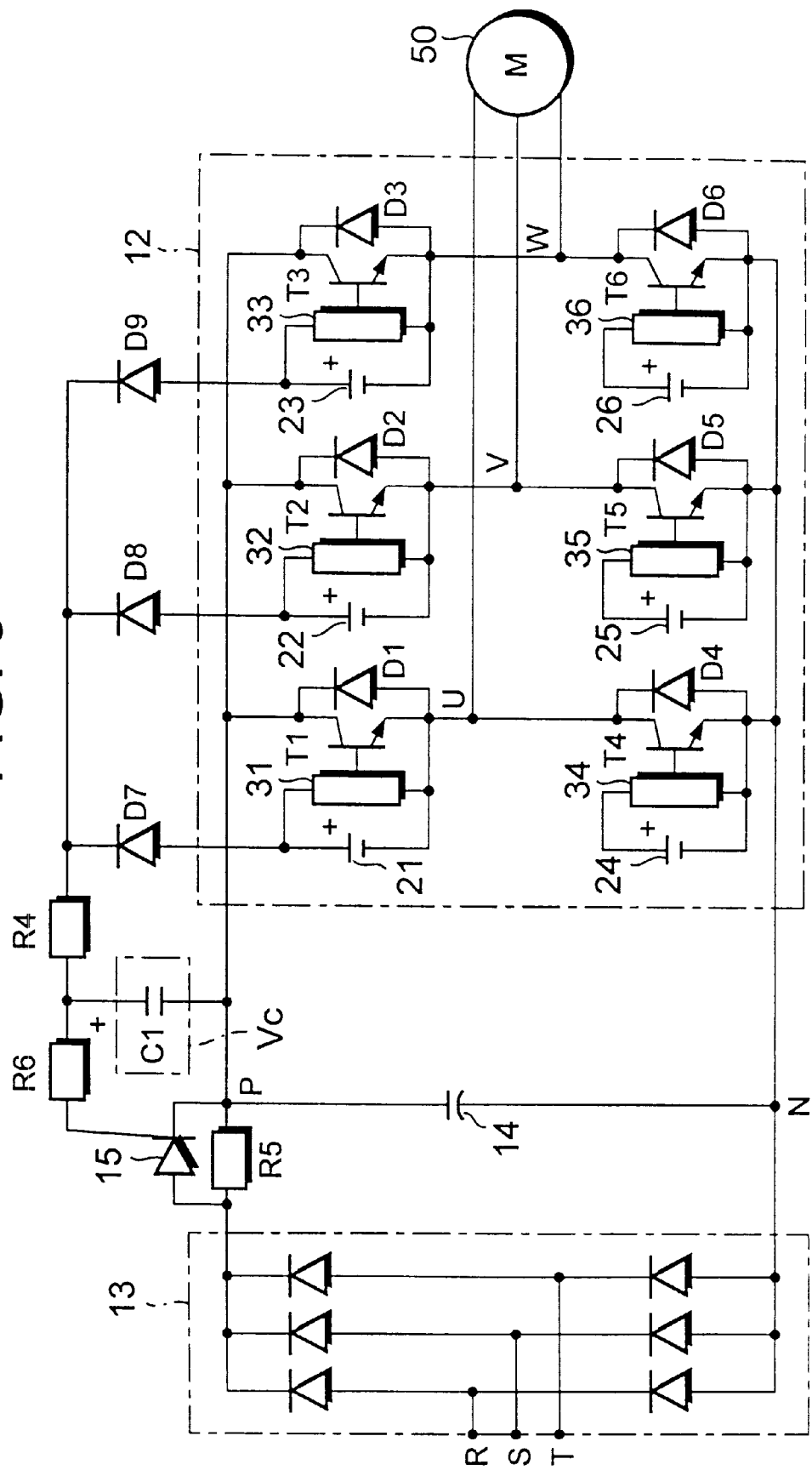
FIG. 5 is a diagram showing the circuit configuration of a voltage type PWM inverter system of a fifth embodiment in accordance with the present invention.

Fifth Embodiment:

FIG. 5 is a diagram showing the circuit configuration of a voltage type PWM inverter system of a fifth embodiment in accordance with the present invention. In the figure, the reference numerals and reference characters 12, 21 through 26, 31 through 36, P, N, T1 through T6, D1 through D6, D7 through D9, R4, U, V, W, C1, Vc, and 50 are identical to those shown in FIG. 4 of the foregoing third embodiment, and the description thereof will be omitted.

Reference numeral 13 denotes a power rectifier constituted by a diode bridge for rectifying AC power supplies R, S, and T to convert them into DC power. Reference numeral 14 denotes a smoothing capacitor that is connected between buses P and N of a DC power supply, holds a DC voltage, which is an output of the power rectifier 13, at a constant level, and helps smooth control of an inverter 12. Reference character R5 denotes a current suppressing and limiting resistor for limiting an inrush current to the smoothing capacitor 14. Reference numeral 15 denotes a thyristor for short-circuiting the resistor R5. Reference character R6 denotes a resistor for limiting the gate current of the thyristor 15.

The anodes of diodes D7–D9 are respectively connected to the positive electrodes of first drive power supplies 21 through 23; the cathodes of the diodes D7–D9 are connected to the capacitor C1 via a resistor R4; and the other terminal of the capacitor C1 is connected to a positive electrode bus P of a DC power supply.

The resistor R6 is connected to the connecting portion of the capacitor C1 and the resistor R4, and the other terminal of the resistor R6 is connected to the gate of the thyristor 15.

In the fifth embodiment, the power supply Vc formed by the capacitor C1 shown in FIG. 1, FIG. 3, or FIG. 4 is applied to an inrush current limiting circuit composed of the thyristor 15.

The operation of the fifth embodiment using the inrush current limiting circuit composed of the thyristor will now be described.

When AC power supplies R, S, and T are turned ON, an increase in the inrush current to a diode of the power rectifier 13 is suppressed by charging the smoothing capacitor 14 via the resistor R5 and the diode is protected.

After completion of the charging of the smoothing capacitor 14, the thyristor 15 is fired so as to short-circuit the both ends of the resistor R5. In above process, the power supply Vc formed by the capacitor C1 is used to supply current to the gate of the thyristor 15, thereby firing the thyristor 15.

For the inrush current limiting circuit composed of the resistor R5 connected in series to the positive electrode bus of the DC power supply and the thyristor 15 connected in parallel, the power supply Vc of the capacitor C1 can be used as the power supply based on the positive electrode bus P of the DC power supply. Hence, no additional power supply such as a switching regulator is required, and a switch (e.g. the photocoupler 16) for firing the thyristor used in the example of the conventional art is no longer necessary. Furthermore, the capacitor C1 is charged only while the voltage type PWM inverter system composed of the three-phase bridge circuit is in operation, so that the control circuit 17 of the inrush current limiting circuit can be also obviated.

Figure 6:
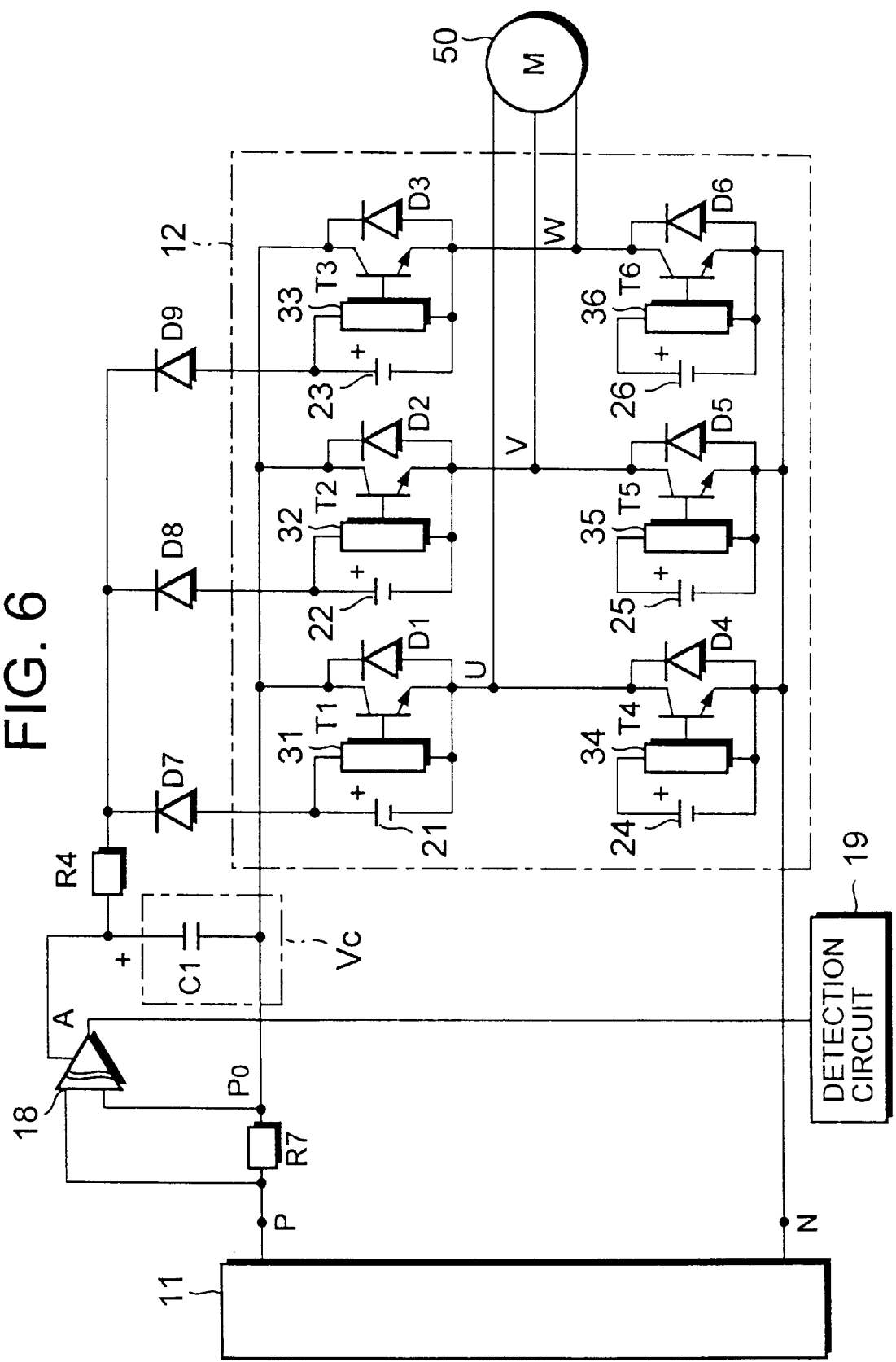
FIG. 6 is a diagram showing the circuit configuration of a voltage type PWM inverter system of a sixth embodiment in accordance with the present invention.
Figure 7:
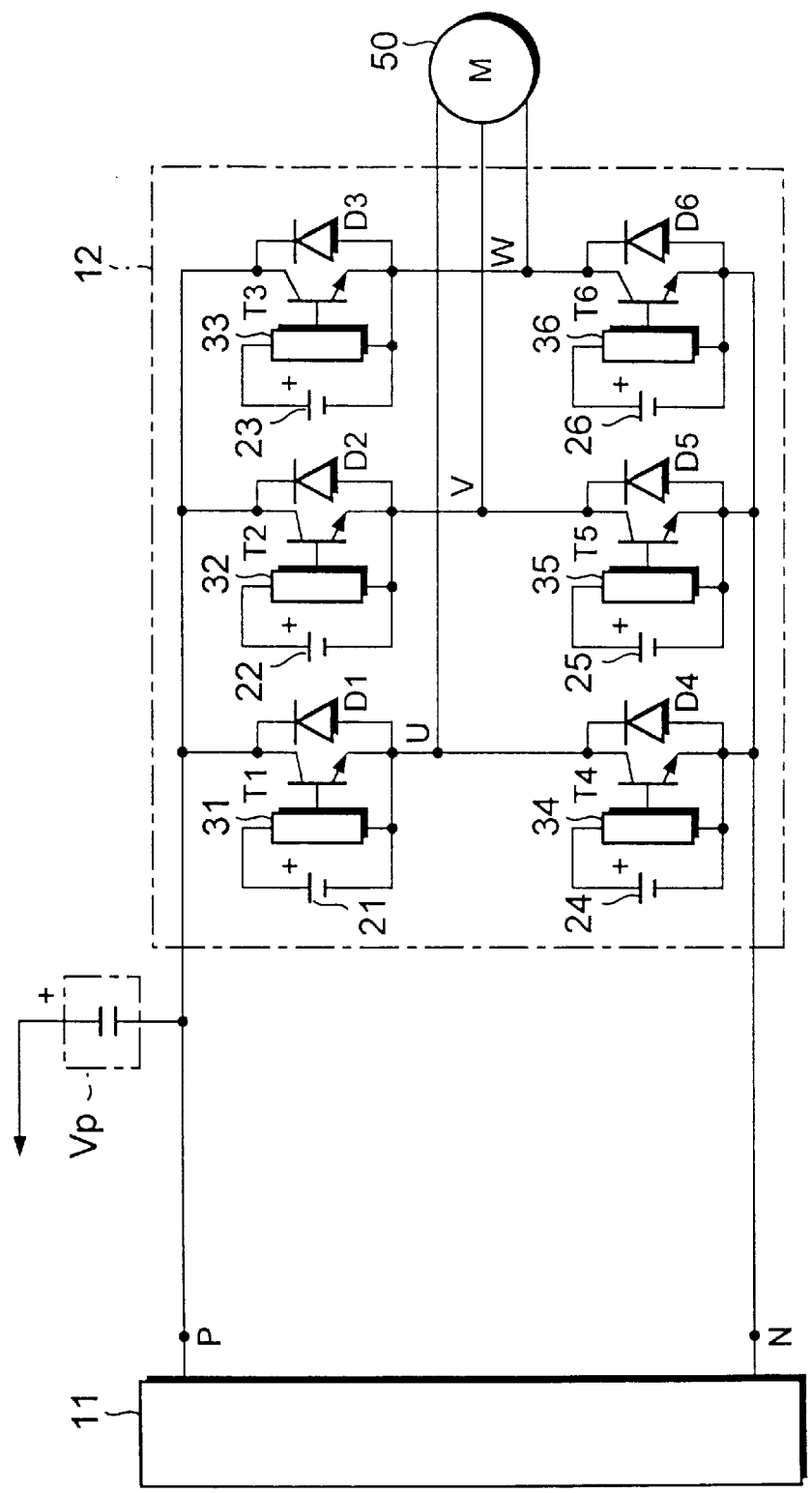
FIG. 7 is a diagram showing the circuit configuration of a three-phase voltage type PWM inverter system composed of a conventional three-phase bridge circuit.
Figure 8:
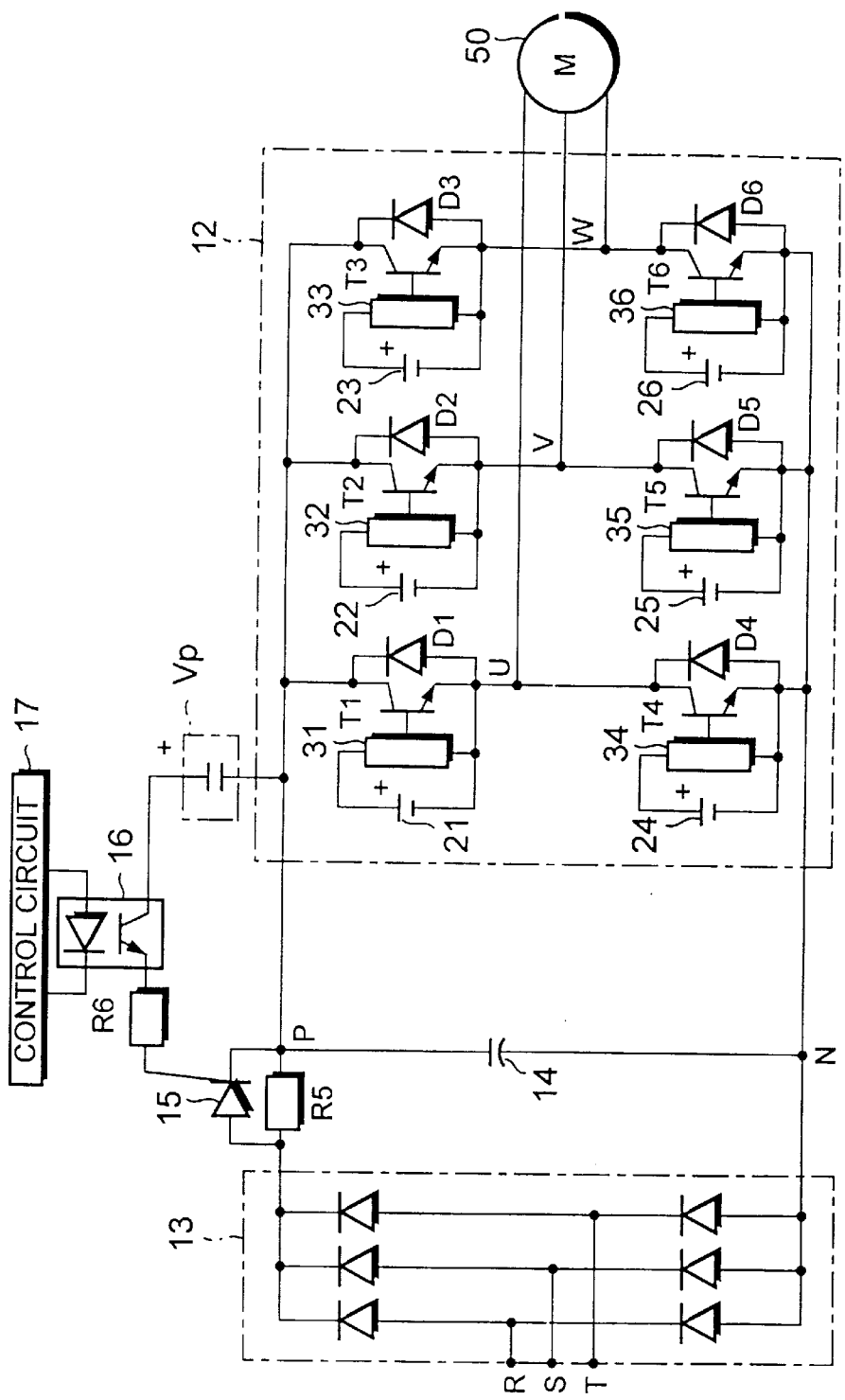
FIG. 8 is a diagram showing the circuit configuration of the conventional three-phase voltage type PWM inverter system that has an inrush current limiting circuit composed using a thyristor.
Figure 9:
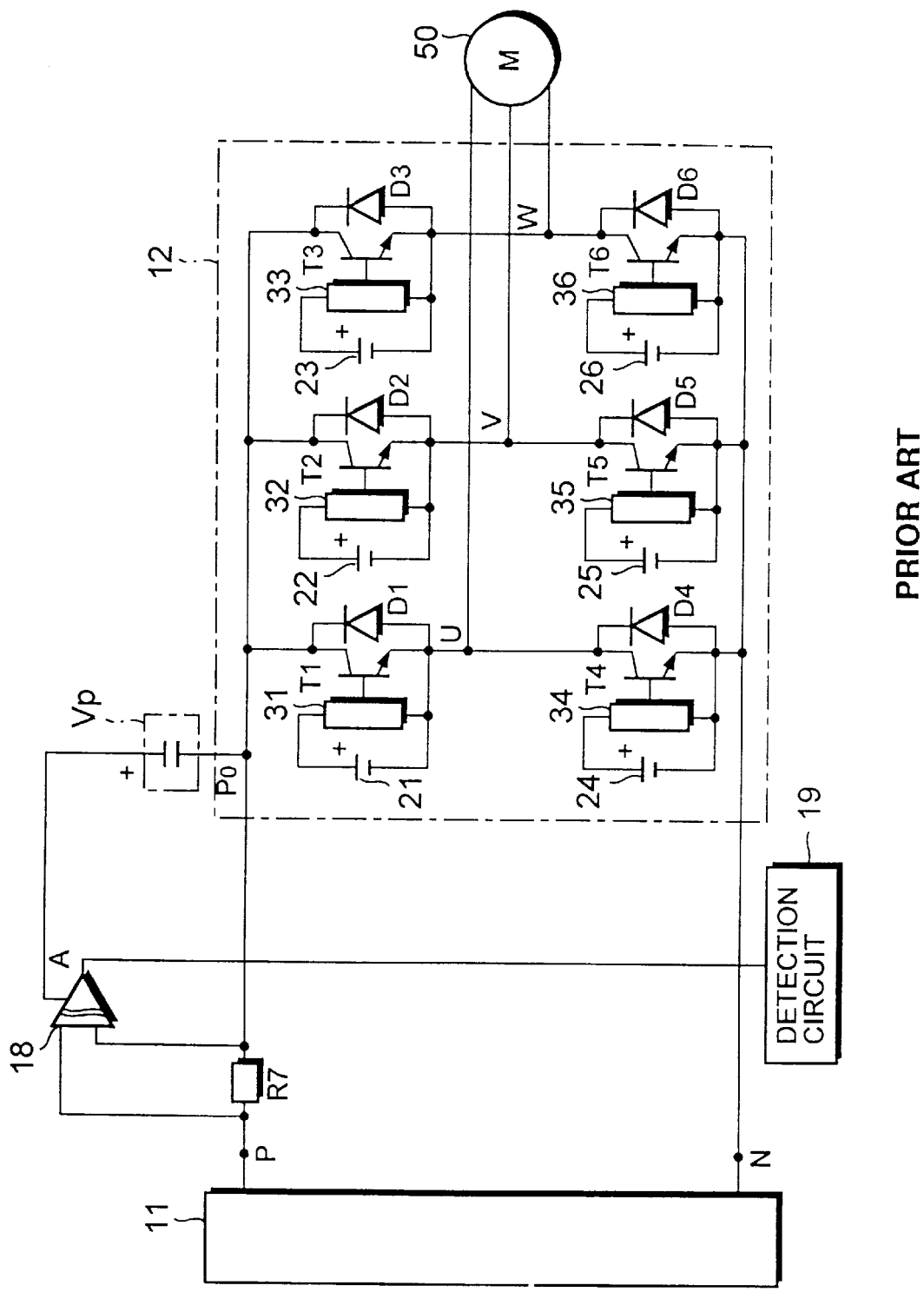
FIG. 9 is a diagram showing the configuration of a current detection circuit that detects the current of a positive electrode bus in the conventional three-phase voltage type PWM inverter system.

Sixth Embodiment:

FIG. 6 is a diagram showing the circuit configuration of a voltage type PWM inverter system of a sixth embodiment in accordance with the present invention. In the figure, the reference numerals and reference characters 11, 12, 21 through 26, 31 through 36, P, N, T1 through T6, D1 through D6, D7 through D9, R4, U, V, W, C1, Vc, and 50 are identical to those shown in FIG. 4 of the foregoing third embodiment, and the description thereof will be omitted.

Reference character Po denotes a positive electrode bus of a DC power supply 11. Reference character R7 denotes a resistor for detecting current that is connected in series between positive electrode buses P and Po of the DC power supply 11. Reference numeral 18 denotes an insulating amplifier for insulating the voltage of the resistor R7 from the positive electrode bus of the DC power supply 11.

The input section of the insulating amplifier 18 is connected to both ends of the resistor R7, while the output section thereof is connected to a detection circuit 19. The positive electrode of a power supply Vc is connected to a power supply input section A of the insulating amplifier 18.

In the sixth embodiment, the power supply Vc grounded on the positive electrode bus of a DC power supply 11 is used as the power supply for the insulating amplifier 18 of a current detection circuit composed of the resistor R7, the insulating amplifier 18, and the detection circuit 19 in a voltage type PWM inverter system constituted by a three-phase bridge circuit.

The operation of the sixth embodiment will now be described.

When current flows into the positive electrode of the DC power supply 11, a voltage is generated at both ends of the resistor R7 connected in series between the positive electrode buses P and Po of the DC power supply 11. The voltage generated at both ends of the resistor R7 is supplied to the detection circuit 19 via the insulating amplifier 18 so as to detect the current flowing into the positive electrode bus of the DC power supply 11.

The power supply Vc of the capacitor C1 can be used as the power supply based on the positive electrode bus Po of the DC power supply 11, thus obviating the need of an additional power supply such as a switching regulator.

In the fifth and sixth embodiments discussed above, the examples have been shown in which the power supply Vc described in the third embodiment is employed as the power supply grounded on the positive electrode bus of the DC power supply 11. However, the same advantage can be obtained by using the power supply Vc of the capacitor C1 described in the first, the second, or the fourth embodiment.

Further, examples based on the three-phase bridge circuit has been given in the above description, it is obvious that the present invention is also applicable to a voltage type PWM inverter system comprising a bridge circuit having a single phase or four or more phases, or to other power converter such as a high power factor converter.

As described above, the present invention can provide the following advantages.

Since a power converter in accordance with the present invention is configured to form the power supply Vc grounded on the positive electrode bus of a DC power supply simply by diodes and a capacitor, the necessity of an additional power supply such as a switching regulator is obviated, so that the circuit size can be made smaller, thereby making it possible to provide an inexpensive power converter.

The current flowing into the diodes D7 through D9 is suppressed by the resistors R1 through R3, even if the capacitance of the capacitor C1 is increased, undue inrush current can be suppressed and the diodes D7 through D9 can be protected at the beginning of the charging of the capacitor C1.

Further, since the current flowing into the diodes D7 through D9 is suppressed by the resistor R4, the number of components can be decreased, thus achieving a smaller circuit size.

Furthermore, the control is performed such that at least one of the switching devices T1 through T3 of the upper arms turns ON during a transitional state such as the start of operation; hence, the power supply Vc formed by the capacitor C1 can be used as the power supply grounded on the positive electrode bus of a DC power supply even in a transitional state such as the start of operation.

In addition, the power supply Vc is used as the power supply grounded on the positive electrode bus of a DC power supply for an inrush current limiting circuit in which a resistor is connected in series with the positive electrode bus of the DC power supply, and a thyristor for short-circuiting the resistor is connected in parallel with the resistor. This obviates the necessity of an additional power supply such as a switching regulator and a switch for firing the thyristor. Furthermore, the capacitor C1 is charged only while the voltage-type PWM inverter system having the three-phase bridge circuit is in operation, so that the control circuit 17 of the inrush current limiting circuit is no longer necessary, permitting the circuit size to be made smaller.

Moreover, the power supply Vc is used as the power supply based on the positive electrode bus of a DC power supply for a current detection circuit which employs a resistor connected in series to the positive electrode bus of the DC power supply, an insulating amplifier for insulating the voltage of the resistor from the positive electrode bus, and a detection circuit. This obviates the necessity of an additional power supply such as a switching regulator and enables a smaller circuit size.

What is claimed is:

1. A power converter comprising:
   a bridge circuit having at least two sets of an upper arm circuit and a lower arm circuit, each said upper arm circuit comprising a switching device and a first diode connected in antiparallel with each other, each said lower arm circuit comprising a switching device and a second diode connected in antiparallel with each other, and said bridge circuit being provided between positive and negative electrodes of a DC power supply;
   first drive power supplies for driving the switching device of each upper arm circuit;
   second drive power supplies for driving the switching device of each lower arm circuit;
   third diodes each having an anode thereof connected to a positive electrode of a respective on of said first drive power supplies; and
   a capacitor having one terminal thereof connected to cathodes of said third diodes and the other terminal thereof connected to the positive electrode of said DC power supply.

2. A power converter as claimed in claim 1, further comprising resistors, each of said resistors being connected in series to with one of said third diode.

3. A power converter as claimed in claim 1, further comprising a resistor provided in series between said capacitor and the cathodes of said third diodes.

4. A power converter as claimed in claim 1, wherein at least one switching device of said upper arm circuit turns ON at the beginning of operation of said power converter.

5. A power converter as claimed in claim 2, wherein at least one switching device of said upper arm circuit turns ON at the beginning of operation of said power converter.

6. A power converter as claimed in claim 3, wherein at least one switching device of said upper arm circuit turns ON at the beginning of operation of said power converter.

7. A power converter as claimed in claim 1, further comprising an inrush current limiting circuit comprising a resistor provided in series with said positive electrode of said DC power supply and a thyristor connected in parallel to this resistor,
   wherein a voltage generated in said capacitor is used as the power supply for firing the thyristor.

8. A power converter as claimed in claim 2, further comprising an inrush current limiting circuit comprising a resistor provided in series with the positive electrode of said DC power supply and a thyristor connected in parallel to this resistor,
   wherein a voltage generated in said capacitor is used as the power supply for firing the thyristor.

9. A power converter as claimed in claim 3, further comprising an inrush current limiting circuit comprising a resistor provided in series with the positive electrode of said DC power supply and a thyristor connected in parallel to this resistor,
   wherein a voltage generated in said capacitor is used as the power supply for firing the thyristor.

10. A power converter as claimed in claim 4, further comprising an inrush current limiting circuit comprising a resistor provided in series with the positive electrode of said DC power supply and a thyristor connected in parallel to this resistor,
    wherein a voltage generated in said capacitor is used as the power supply for firing the thyristor.

11. A power converter as claimed in claim 1, further comprising a current detection circuit comprising a resistor provided in series with the positive electrode of said DC power supply, an insulating amplifier for insulating the voltage of this resistor from the positive electrode, and a detection circuit for detecting a current based on an output of the insulating amplifier,
    wherein a voltage generated in said capacitor is used as the power supply for operating the insulating amplifier.

12. A power converter as claimed in claim 2, further comprising a current detection circuit comprising a resistor provided in series with the positive electrode of said DC power supply, an insulating amplifier for insulating the voltage of this resistor from the positive electrode, and a detection circuit for detecting a current based on an output of the insulating amplifier, wherein a voltage generated in said capacitor is used as the power supply for operating the insulating amplifier.

13. A power converter as claimed in claim 3, further comprising a current detection circuit comprising a resistor provided in series with the positive electrode of said DC power supply, an insulating amplifier for insulating the voltage of this resistor from the positive electrode, and a detection circuit for detecting a current based on an output of the insulating amplifier, wherein a voltage generated in said capacitor is used as the power supply for operating the insulating amplifier.

14. A power converter as claimed in claim 4, further comprising a current detection circuit comprising a resistor provided in series with the positive electrode of said DC power supply, an insulating amplifier for insulating the voltage of this resistor from the positive electrode, and a detection circuit for detecting a current based on an output of the insulating amplifier, wherein a voltage generated in said capacitor is used as the power supply for operating the insulating amplifier.

15. A power converter as claimed in claim 1, wherein said bridge circuit provides a voltage-type PWM inverter system.

16. A power converter as claimed in claim 15, wherein a PWM pulse for said voltage-type PWM inverter system is obtained by comparing sinusoidal reference signals with triangular carrier waves.

17. A power converter as claimed in claim 7, wherein said DC power supply comprises a power rectifier comprising a diode bridge for converting AC power to DC power and a smoothing capacitor for eliminating voltage ripple.

* * * * *